United States Patent

Cruickshank

[15] 3,688,676
[45] Sept. 5, 1972

[54] PHOTO RECORDING ASSEMBLY

[72] Inventor: John S. Cruickshank, "Rosemount," Kintillo Road, Bridge of Earn, Perth, Scotland

[22] Filed: June 22, 1970

[21] Appl. No.: 48,214

[30] Foreign Application Priority Data

June 20, 1969 Great Britain..........31,387/69

[52] U.S. Cl.....................95/86, 346/107 R, 355/47, 355/52
[51] Int. Cl..............................................G03b 17/56
[58] Field of Search..........95/86, 12, 15; 355/40, 43, 355/47–49, 50, 51, 52, 65, 66, 22; 346/107 R

[56] References Cited

UNITED STATES PATENTS

| | | |
|---|---|---|
| 2,002,090 | 5/1935 | Ives..........................355/22 X |
| 2,163,125 | 6/1939 | Jeffreys et al...................95/12 |
| 2,163,124 | 6/1939 | Jeffreys et al...................95/12 |
| 3,289,528 | 12/1966 | Petreycik......................355/52 |
| 3,244,065 | 4/1966 | Lemelson......................95/12 |
| 3,267,799 | 8/1966 | Harrison......................95/12 |
| 3,037,441 | 6/1962 | Leach..........................95/86 |

Primary Examiner—Samuel S. Matthews
Assistant Examiner—Richard A. Wintercorn
Attorney—Molinare, Allegretti, Newitt & Witcoff

[57] ABSTRACT

The assembly makes series of photographs of an object so as to record outline changes thereof through a preselected angular and/or longitudinal distance. It has a structure including circular or partly circular guide means for guiding a trolley carrying the camera and a light projector, so that photographs of the object, which is substantially in the center of the curvature, can be taken.

8 Claims, 3 Drawing Figures

PATENTED SEP 5 1972

3,688,676

PHOTO RECORDING ASSEMBLY

DESCRIPTION OF INVENTION

The invention relates to a photo recording assembly for making a series of photographs of an object so that the outline changes of the photographed object occurring through a preselected angular and/or longitudinal distance are recorded on a photographic film.

A photo recording assembly according to the invention comprises a stationary or movable structure including guide means curved in the shape of a circle or a part of a circle, a trolley, carrying a camera and a light projector for illuminating the object, being adapted to be supported and to be displaceable along the guide.

The structure may comprise a stationary main frame and movable frame displaceable on and along the stationary frame.

The invention will now be described with reference to an embodiment designed specifically to record outline changes of a horizontally extending object, in the illustrated example of a lying body, by a camera movable about the object through an angular distance smaller than 180° and adapted to take pictures at regular angular intervals.

Figures 1, 2, 3:
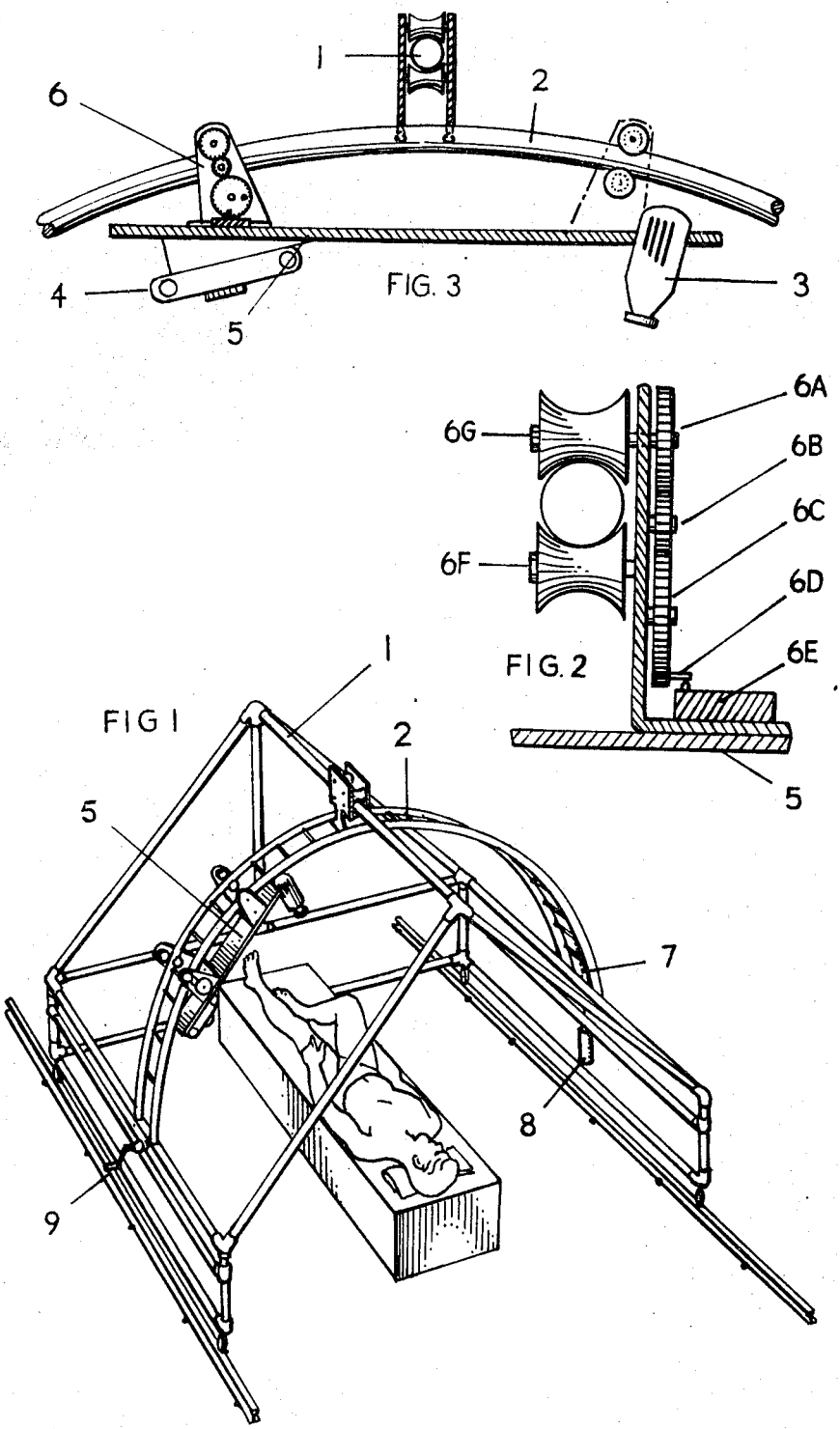
FIG. 1 is a perspective view of the assembly.
FIG. 2 is a detail illustrating means for actuating the electric circuit.
FIG. 3 illustrates details of the trolley.

The assembly comprises a horizontally extending main supporting frame 1 formed by interconnected tubular sections and supported on wheels, which can be transported on its wheels to the place of its use and there made stationary. The main frame 1 carries a semicircular frame 2 comprising two semicircular guide members and adapted to travel on and along the main frame 1. The guide members of the slidable frame 2 carry a trolley 5 adapted to be displaced on and along the frame 2 by means of a cord 7, one end of which is attached to a winder and ratchet mechanism 9 and the other end is provided with a balance weight 8.

The trolley 5 carries at its ends a slit projector 3 and a camera 4, respectively, both of which are angularly displaceable. The trolley 5 is suspended on the two members of the frame 2 by means of four pairs of wheels. One of the said pairs of wheels comprises a travel wheel 6F and a counter wheel 6G adapted to roll in a non-slip way on one of the semicircular members when the trolley 5 is pulled by the cord 7.

A driver gear 6A, which is co-axial and rotates with the wheels 6G, drives by means of an idler 6B a follower 6C, which is provided with a pin 6D adapted to actuate a micro-switch 6E on each full turn of the follower 6C. The micro-switch closes and opens an electric circuit actuating the camera 4, which is a camera with electrically controlled shutter and automatic rewind mechanism.

The gear train 6A, 6B, 6C is so designed that each predetermined angular distance, e.g. after each 2°, travelled by the trolley 5, the follower 6C turns through 360° and actuates by its pin 6D the switch 6E, so that a picture is taken by the camera 4.

The assembly according to the invention comprises also means to prevent taking pictures when it is not desired, for instance during preparation of the trolley, camera or projector for operation. To this end the circuit can be provided with another switch or the microswitch 6E can be adapted to be displaceable from the path of the actuating pin 6D.

The function of the assembly will now be explained in connection with making a series of photographs of a body. The corpse is placed below the assembly or the assembly is driven to and placed above the body (FIG. 1), the slidable frame 2 is placed at the head of the body, the camera and projector are adjusted, the trolley is positioned at one end of the frame 2 and is pushed by means of the cord 7 along the frame 2 while a picture is taken as described, e.g. each 2° of angular displacement of the trolley and thus of the camera and projector.

After the trolley 5 reaches a predetermined position at the other end of the slidable frame 2, the whole slidable frame is moved from the head toward the feet of the body through a predetermined distance, dependent on the optical system of the camera. Then the previously described cycle is repeated.

It will be understood that the described embodiment of a photo recording assembly for a horizontally extending stationary object, less than half of which peripheral shape is of importance can easily be adapted for an object the whole of which periphery should be photographed. This can easily be achieved for instance by making the frame 2 circular.

The apparatus can be used for vertically extending objects in which case the circular or partly circular frame and guide member or members extend in a horizontal plane and are displaceable vertically on a vertical main frame.

It will be further understood that the above embodiments are designed for an object which is so long that its whole length cannot be photographed, and consequently first of all a series of photographs of its upper part and a series of photographs of its lower part must be made. For shorter objects the structure of the apparatus can be much simpler as it need not be longitudinally displaced and consequently the apparatus will consist only of a stationary frame, which will be shaped and adapted substantially as the slidable frame 2 described above.

Instead of a still photographic camera a cine camera, having a variable frame speed, can be used and if the movement of the cine camera on the guide members and the frame speed of the camera are synchronized no gearing for the actuation of the camera is needed.

What I claim is:

1. A photo recording assembly for making a series of photographs of an object so that the outline changes of the photographed object occurring through a preselected angular and/or longitudinal distance are recorded on a conventional photographic film comprising in combination a structure including a first part and a second part carried by and displaceable on said first part, said second part including guide means curved to define at least part of a circle, a trolley carried by and displaceable on said guide means, said trolley carrying a motor driven camera and a slit light projector for illuminating the object, said camera and said slit light projector being angularly displaceable relative to each other and their position relative to said photographed object being adjustable.

2. A photo recording assembly according to claim 1 wherein said trolley is displaceable on said guide means by means of a travelling gear, said gear including at least one wheel rotatable in a non-slip way on said guide means when said trolley is displaced, said wheel being adapted to actuate control means of said camera.

3. A photo recording assembly according to claim 2 including a switch element arranged between said wheel and said camera control means and preventing said camera from taking pictures when switched off.

4. A photo recording assembly according to claim 1 wherein said camera is a cine camera with variable frame speed.

5. A photo recording assembly according to claim 1 wherein the trolley is carried on the guide means by at least a pair of cooperating wheels, one of said pair of wheels being adapted to roll in a non-slip way on said guide means when said trolley is displaced.

6. A photo recording assembly according to claim 5 including camera control means for actuating the camera and gear means operatively connected to said one wheel for rotation therewith, said gear means being adapted to actuate said camera control means periodically during rotation thereof.

7. A photo recording assembly according to claim 6 wherein the camera control means includes a switch element and said gear train includes a gear having a pin thereon adapted to engage the switch element and actuate same.

8. A photo recording assembly as in claim 1 wherein the first part is stationary and said trolley is displaceable on said guide means by means of a traveling gear on said guide means.

* * * * *